United States Patent Office 2,699,432
Patented Jan. 11, 1955

2,699,432

PAPER COATING COMPOSITIONS COMPRISING AN ADHESIVE, AN ALKALI METAL SILICATE, AND AN ATTAPULGITE OR ZEOLITE MATERIAL

William H. Marra, Portland, and John C. Stinchfield, Westbrook, Maine, assignors, by mesne assignments, to The National Cash Register Company, Dayton, Ohio, a corporation of Maryland No Drawing. Application May 26, 1951, Serial No. 228,542

1 Claim. (Cl. 260—29.6)

This invention pertains to a paper coating composition containing relatively large amounts of highly adsorbent, high ion-exchange capacity pigments and to paper coated therewith, and more particularly pertains to a paper coating composition including an aqueuos dispersion of the highly adsorbent, high ion-exchange pigment and a relatively small amount of adhesive together with an alkali metal silicate which acts as a fluxing and dispersing agent and which most importantly acts in another capacity as a protective agent for the adhesive so its pigment binding characteristics toward the paper are preserved against the deleterious action of the adsorbent pigment, whereby the relatively high amounts of pigment with respect to the adhesive may be used. Paper coated with such composition has exposed thereon a large percentage of the surface of the ion-exchange pigments, because of the small amount of adhesive used.

By high ion-exchange capacity pigment is meant one that has an exchange capacity above 20 milli-equivalents per 100 grams.

By such protective action of the silicate material only relatively small amounts of adhesive need to be used whereas without such protective action more adhesive would have to be used. Attapulgite, for example, known commercially as attapulgus clay, is such a highly adsorbent, high ion-exchange capacity pigment that in time, in some manner, it tends to render ineffective latex adhesives and other common paper coating adhesives, probably due to some adsorption phenomenon and, moreover, tends to thicken unduly in an aqueous medium.

The use of an alkali metal silicate such as sodium silicate or potassium silicate in attapulgite-containing coatings solves both of these problems, the silicate material acting as a dispersing and fluxing agent as well as acting as a protectant for the adhesive.

Attapulgite-containing coatings on paper, because of the acidic adsorption surface activity of the attapulgite particles, have the power to change the color of some double bond organic compounds on adsorption contact therewith and, therefore, act as sensitive coatings which cause the appearance of a distinctive color in such double-bond compounds when applied to such coated paper in printing or writing operations. This type of double-bond compound may be represented by the colorless crystalline substance 3.3 bis(p-dimethylaminophenyl) 6-dimethylamino phthalide, which has the structure

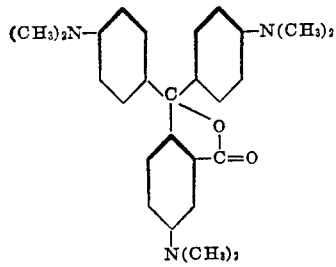

This organic compound which conveniently may be called "crystal violet lactone," may be dissolved in small amounts in an oily substance, such as chlorinated diphenyl with 48% chlorine content, and when so dissolved it forms a printing fluid which may be used on attapulgite-coated paper. When so used the printing fluid makes a deep blue mark where it contacts the attapulgite. In order to permit the printing fluid to contact the attapulgite it is necessary to use the very minimum of adhesive with respect to the attapulgite, which latter must be left largely exposed. The same marking phenomenon occurs with other compounds, a large number of which are disclosed in United States patent application Serial No. 41,756, filed by Barrett K. Green, on July 31, 1948. Obviously the more unmasked or bare surface area of attapulgite particles in a given area of the receiving sheet the stronger will be the color of the print made thereon by the organic compound. High content of attapulgite particles, with respect to adhesive, therefore, is desirable in the coating mixture intended for such use.

This invention provides a coating composition in which alkali metal silicate material is used as a protective for the adhesive and as a dispersant and fluxing agent for the attapulgite, such dispersing and protective effects being maintained for long periods of time even when a large proportion of the highly adsorbent pigment is used with respect to the adhesive.

Sodium silicate, because of its cheapness and availability, is a preferred one of the alkali metal silicates for use as such a dispersing and fluxing agent and as a protective for the adhesive, and is effective when used in a mixture in amounts ranging from 1% to 20% dry weight, calculated on the dry weight of the highly adsorbent pigment, 4% giving a maximum effect as an adhesive protector.

Following is a preferred method of making the attapulgite-containing coating composition with a latex adhesive, the ingredients being added to water in the order given, the parts being given by weight:

| | Parts |
|---|---|
| Ammonium caseinate solution | 12 |
| Sodium silicate solution | 10 |
| Attapulgite (attapulgus clay) followed by good agitation | 100 |
| Tetra-sodium pyrophosphate solution | 20 |
| Latex 48% solids | 16.6 |

Potassium silicate solution may be substituted in the foregoing formula in the same proportions and amount, with equivalent results. The ammonium caseinate solution is prepared by dispersing 100 parts of casein in 500 parts of water (which may be warm) and adding 12 parts of ammonia (28% NH3 in water). The sodium silicate should be of approximately 28.7% SiO2 and 8.9% Na2O content, and such may be purchased in solution from the Philadelphia Quartz Company, of Philadelphia, as their "N" brand having a density of 41.0° Beaumé. The preferred latex is an anionic butadiene-styrene copolymer dispersion in water of approximately 45% solids content and a pH of 9–10.5, and may be purchased as "Dow Latex 512K" from The Dow Chemical Company, Midland, Michigan. The tetra-sodium pyrophosphate is used as a 5% solution in water. Water is used in the mixture in an amount to arrive at a final solids content of 32%.

The above coating may be varied considerably both as to ingredients and as to amounts of ingredients without destroying the dispersing, fluxing and adhesive protection action of the metal silicate material with respect to the attapulgite. For instance the attapulgite may be replaced in whole or in part by other highly adsorbent pigments such as sodium zeolite, zeolite material in which the sodium base exchange ions have been exchanged for other metallic ions, or hydrogen zeolite material, or replaced in part by common low adsorbent pigments such as kaolin, calcium carbonate or titanium dioxide.

As another variation, a sodium silicate solution with a 25.3% SiO2 and a 6.7% Na2O content with a density of 35° Beaumé may be used in place of that sodium silicate specified as preferred, in the same quantity, with approximately equal results.

The silicate material will be effective with any of the common paper coating adhesives such as other latexes including butadiene-acrylonitrile copolymer, styrene-isoprene copolymer, polychloroprene, methyl acrylate-acrylonitrile copolymer, and conventional non-latex adhesives, such as oxidized starch, dextrin, and enzyme-converted starch, all of which are used with comparable solids content. These substitute adhesives may be used interchangeably.

|  | Total Weight | Dry Weight |
|---|---|---|
| Attapulgite | 100 | 100 |
| Sodium silicate "N" brand | 10 | 3.8 |
| Starch adhesive (white dextrin) | 100 | 20 |
| Water | 232 | |

In the example just given the solids amount to about 28% of the whole weight of the composition.

Other adhesives such as casein, soy protein, and polyvinyl alcohol may be used for higher-viscosity coatings with the same solids content or may be used at lower solids content for lower-viscosity coatings.

It will be observed that the protective action of the metal silicate material is not dependent on the type of adhesive used.

The specified attapulgite coating compositions without the sodium silicate will, when allowed to stand for a time and then applied to paper and dried, flake very badly. An addition of 0.475% of the specified sodium silicate, as solids in the dried coating, shows marked improvement, there being only medium flaking. An addition of 0.95% of the said sodium silicate gives a coating having slight flaking. An addition of 1.9% of the sodium silicate gave a coating with practically no flaking, and this changed to no flaking as the amount of sodium silicate was increased to 3.8%.

The coating is applied to paper preferably at between 8 and 16 pounds per ream of paper, 24 inches by 36 inches.

What is claimed is:

A paper coating composition of water and solids, the solids amount to about 28 to 32 per cent, by weight, of the composition, said solids including 100 parts, by weight, of a highly adsorptive pigment having an ion-exchange equivalent of above 20 milli-grams per 100 grams and taken from the class of substances consisting of attapulgite and zeolite material having metallic base-exchange ions, from 1% to 20% dryweight, calculated on the dryweight absorbent pigment basis, of sodium silicate solution having a ratio of $SiO_2$ to $Na_2O$ of 3.22:1, and about 8% dryweight, calculated on the dryweight of the absorbent pigment, of adhesives, said adhesives being taken from the class of paper coating adhesives consisting of latices of butadiene-acrylonitrile copolymer, styrene-isoprene copolymer, polychloroprene, and methyl acrylate-acrylonitrile copolymer.

References Cited in the file of this patent

UNITED STATES PATENTS

| 2,051,410 | Kenney | Aug. 18, 1936 |
| 2,181,299 | Burgess | Nov. 28, 1939 |
| 2,531,396 | Carter et al. | Nov. 28, 1950 |
| 2,217,119 | Kerr | Oct. 8, 1940 |
| 2,597,872 | Iler | May 27, 1952 |